(No Model.)

J. A. DICKSON.
AUTOMATIC WAGON BRAKE.

No. 346,196. Patented July 27, 1886.

Witnesses

Inventor,
John A. Dickson,
By his Attorneys

United States Patent Office.

JOHN AMOS DICKSON, OF PULASKI, TENNESSEE.

AUTOMATIC WAGON-BRAKE.

SPECIFICATION forming part of Letters Patent No. 346,196, dated July 27, 1886.

Application filed May 27, 1886. Serial No. 203,463. (No model.)

*To all whom it may concern:*

Be it known that I, JOHN AMOS DICKSON, a citizen of the United States, residing at Pulaski, in the county of Giles and State of Tennessee, have invented a new and useful Improvement in Automatic Wagon-Brakes, of which the following is a specification.

My invention relates to improvements in automatic wagon-brakes; and it consists of the peculiar combination and novel construction and arrangement of the various parts for service, substantially as hereinafter fully set forth, and particularly pointed out in the claims.

The object of my invention is to provide an improved brake for wagons and other like vehicles which shall act automatically when the vehicle descends an incline or hill to apply the brake-shoes with a force proportionate to the weight of the load thereon, and to release the brake-shoes when the vehicle reaches a level; to provide means for preventing the brake from being applied to the wheels when it is desired to "back" the vehicle; to provide novel means for relieving the operative parts of the brake under the strain and draft on the pole; and, finally, to improve the brake in minor details of construction, so that it will be very simple, strong, and durable, cheap and inexpensive of manufacture, and easily and readily applied to vehicles of ordinary construction.

Figure 1:
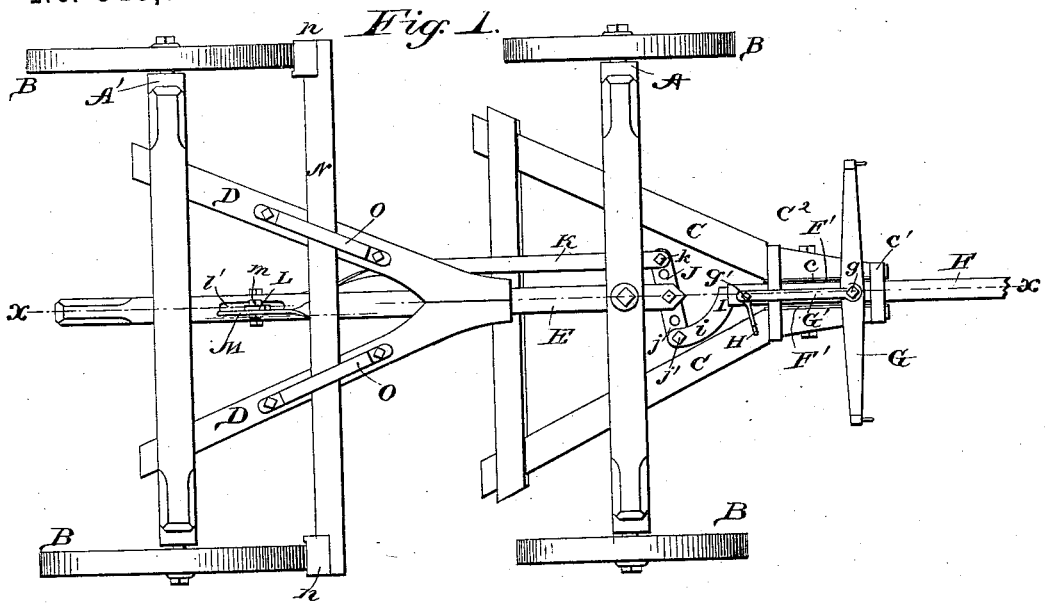
Figure 2:
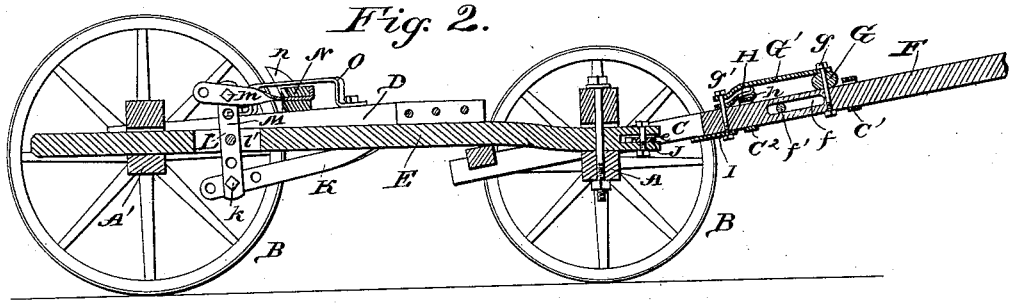
Figure 3:
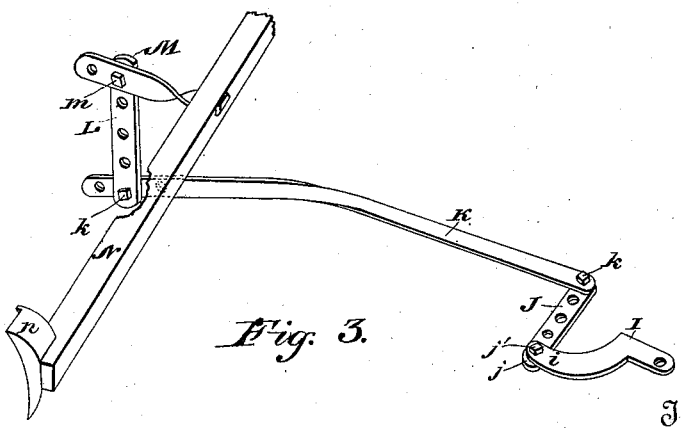

In the accompanying drawings, which illustrate an automatic wagon-brake embodying my invention, Figure 1 is a top plan view of my improved brake applied to a vehicle running-gear. Fig. 2 is a longitudinal vertical sectional view on the line $x\,x$ of Fig. 1. Fig. 3 is a perspective view of my invention detached from the vehicle.

Referring to the drawings, in which like letters of reference denote corresponding parts in all the figures, A A' designate the front and rear axles, B the carrying-wheels, C the front hounds, D the rear hounds, and E the reach or coupling-pole, of a vehicle running-gear, which are of the usual or any preferred construction of a vehicle in common use. The front hounds, C, are arranged or separated or held apart at their front ends to provide a space, $c$, and the said ends are braced and strengthened by straps or bands C' C², which are suitably and rigidly secured in place.

F designates the draft-pole, which is fitted between the front ends of the hounds and the straps C' C², and the said pole is free to move or slide longitudinally between the hounds and straps. The draft-pole is slotted transversely and horizontally, as at $f$, which slot extends longitudinally of the pole for a suitable distance, to permit a like amount of play thereof, and through this slot passes a bolt or pin, $f'$, that is rigidly secured in place in the front ends of the hounds C, the rear end of the slot abutting against the bolt to limit the outward play or movement of the pole and prevent the draft or strain from being communicated to the brake devices. The rear end of the draft-pole carries the double-tree G, which is of any ordinary or preferred construction, and pivotally connected to the pole by means of a through-bolt, $g$, and one end of a brace or strap, G', bears on the double-tree, and is confined in place by the same through-bolt $g$ that forms the pivot for the double-tree, as shown. The strap or brace G' is curved or inclined longitudinally, as shown, and the other end thereof is secured to the rear end of the draft-pole by a bolt, $g'$, that passes through the pole.

H designates a detaining-hook, which is pivoted at one end on the bolt $g'$, and the other end of the hook is provided with an angular lip or claw, $h$, which is adapted to take over the upper edge of the strap C² and prevent the draft-pole, by which the hook is carried, from moving rearwardly when it is desired to back the vehicle, as is ofttimes necessary. The rear end of the bolster is provided with wear-plates F', that are secured rigidly thereto by means of through-bolts, and these wear-plates are arranged on the sides of the draft-pole and come in contact with the opposing faces of the front ends of the hounds C, to reduce the friction and wear on the rubbing parts in contact. The rear end of the longitudinally-movable pole carries an arm or link, I, that is rigidly secured thereto by bolts or screws, and the link is provided with a laterally curved or inclined end, $i$, which is perforated, as at $i'$. This perforated end of the link is adjustably and pivotally connected to the perforated end $j$ of a centrally-pivoted lever, J, that is arranged in either a horizontal or vertical position in the front slotted end, e, of the reach or coupling-pole. The pivot between the end j of the lever J and the bent end of the arm I is effected by means of a bolt or pin, j', and this pin can be detached to adjustably connect the lever and arm to vary the power or leverage of the brake as desired. To the other end of the centrally-pivoted lever J is pivotally and adjustably connected the front end of a connecting-rod, K, and when the lever J is arranged in a horizontal position this rod is bent or twisted so that its rear end is at right angles to the front end, whereby it will be in proper condition to be connected pivotally to the lower end of a perforated swinging lever, L, that is arranged in a vertical position in a vertical longitudinal slot, e', at the rear end of the reach or coupling-pole. The pivot-connection between the front and rear ends of the connecting-rod and the levers J and L is formed by means of removable pins or bolts K, so that the rod is adjustably connected to the lever J, to vary the length of play or movement of the brake bar and shoes, and with the lever L to vary the power of the brake. The lever L is pivoted centrally to the rear end of the reach, and the upper end thereof is perforated and adjustably connected to the perforated rear end of a link, M, by means of a bolt, m, and the link M is secured to the brake-bar N, so that the length of the play or movement of the bar can be varied. The brake-bar rests and slides on the upper surface of the rear hounds, D, and at its ends it carries the shoes or blocks n, that bear against the wheels to retard the movements of the latter. The brake-bar is confined and held in place by means of straps or stirrups o, which are elevated above and out of contact with and bolted at their ends to the rear hounds, D.

This being the construction of my improved automatic wagon-brake, the operation thereof is as follows: When the vehicle is in motion upon a level surface, the draft-pole is drawn forward until the bolt or pin f' abuts against the rear end of the slot f, and relieves the operative parts of the brake from draft and strain, which thereby obviates the danger of breakage to the parts. When in this position, the brake-shoes are drawn away from the wheels to release the brakes, and the detaining-hook H is thrown back out of the way, so that it does not engage the strap C²; but when it is desired to back the vehicle the detaining-hook is turned or adjusted so that its claw h will engage the strap and prevent rearward movement of the draft-pole to prevent it from applying the brakes. When the vehicle descends a declivity or hill, the horses are pulled back, and the weight of the vehicle causes the draft-pole to slide or move longitudinally and rearwardly, the detaining-hook having been first thrown out of operative position, so that the arm I will oscillate the swinging lever J, to draw the connecting-rod and the lower end of the lever L forwardly, which forces the upper end of the lever L rearwardly, and draws the brake-bar in the same direction to apply the shoes to the wheels and retard the motion thereof; and when the vehicle again travels on a level surface or up an incline the draft-pole is drawn or moved longitudinally and forwardly to release the brake, as will be very readily understood. It will thus be seen from the foregoing description, taken in connection with the drawings, that I provide a brake which is automatic, thoroughly effective, and reliable in operation, is simple, strong, and durable in construction, cheap and inexpensive of manufacture, and easily and readily applied to the ordinary class of vehicles. The detaining-hook provides effective means for preventing the application of the brake when the vehicle is being backed, and by the various adjustments of the levers and links the power of the brake and play or movement of the brake-bar can be varied to adapt the brake for service in different kinds of work and country, whether mountainous or hilly.

Having thus fully described my invention, what I claim as new, and desire to secure by Letters Patent, is—

1. The combination of a longitudinally-movable draft-pole carrying the link, a swinging lever, J, having one end of the link adjustably connected thereto, a lever, L, a connecting-rod intermediate of the levers J and L, and adjustably connected to the latter, and a brake-bar actuated by the lever L, substantially as described.

2. The combination of a longitudinally-movable draft-pole, an arm or link carried thereby, a swinging lever, J, having one end pivotally connected with the link, a lever, L, having the perforated upper end, a rod intermediate of the levers J and L, and adjustably connected to the former, J, a brake-bar carrying the shoes, and a link carried by the brake-bar and adjustably and pivotally connected to the perforated end of the lever L, substantially as described.

3. The combination, with the hounds, the reach having the longitudinal slots e e', and the straps fitted over the hounds, of the longitudinally-movable and slotted draft-pole, a pin or bolt supported in the hounds and passing through the slot of the pole to limit the movements of the latter, an arm or link, I, carried by the pole, and having the lateral perforated arm, a centrally-pivoted perforated lever, J, arranged in the slot e of the reach, and having one end pivotally and adjustably connected to the link I, a vertically-disposed perforated lever, L, arranged and pivoted centrally in the slot e' of the reach, a connecting-rod adjustably and pivotally connected to the levers J and L, a brake-bar carrying the shoes, the rigid stirrups for guiding the bar, and an arm or link carried by the brake-bar and adjustably and pivotally connected to the upper end of the lever L, all arranged and combined substantially as described.

4. The combination, with the hounds and the straps, of the longitudinally-movable draft-pole, a detaining-hook pivoted to and carried by the pole, and adapted to engage one of the straps to prevent retrograde movement of the pole, and brake mechanism, to be actuated by the pole when the detaining-hook is released, substantially as described.

In testimony that I claim the foregoing as my own I have hereto affixed my signature in presence of two witnesses.

JOHN AMOS DICKSON.

Witnesses:
J. L. JONES,
J. J. PHILLIPS.